3,269,784
CONTROL VALVE WITH MULTIPLE ACTUATORS
Richard C. Bueler, Glendale, Mo., assignor to Wagner Electric Corporation, St. Louis, Mo., a corporation of Delaware
Filed Mar. 3, 1965, Ser. No. 436,738
20 Claims. (Cl. 303—52)

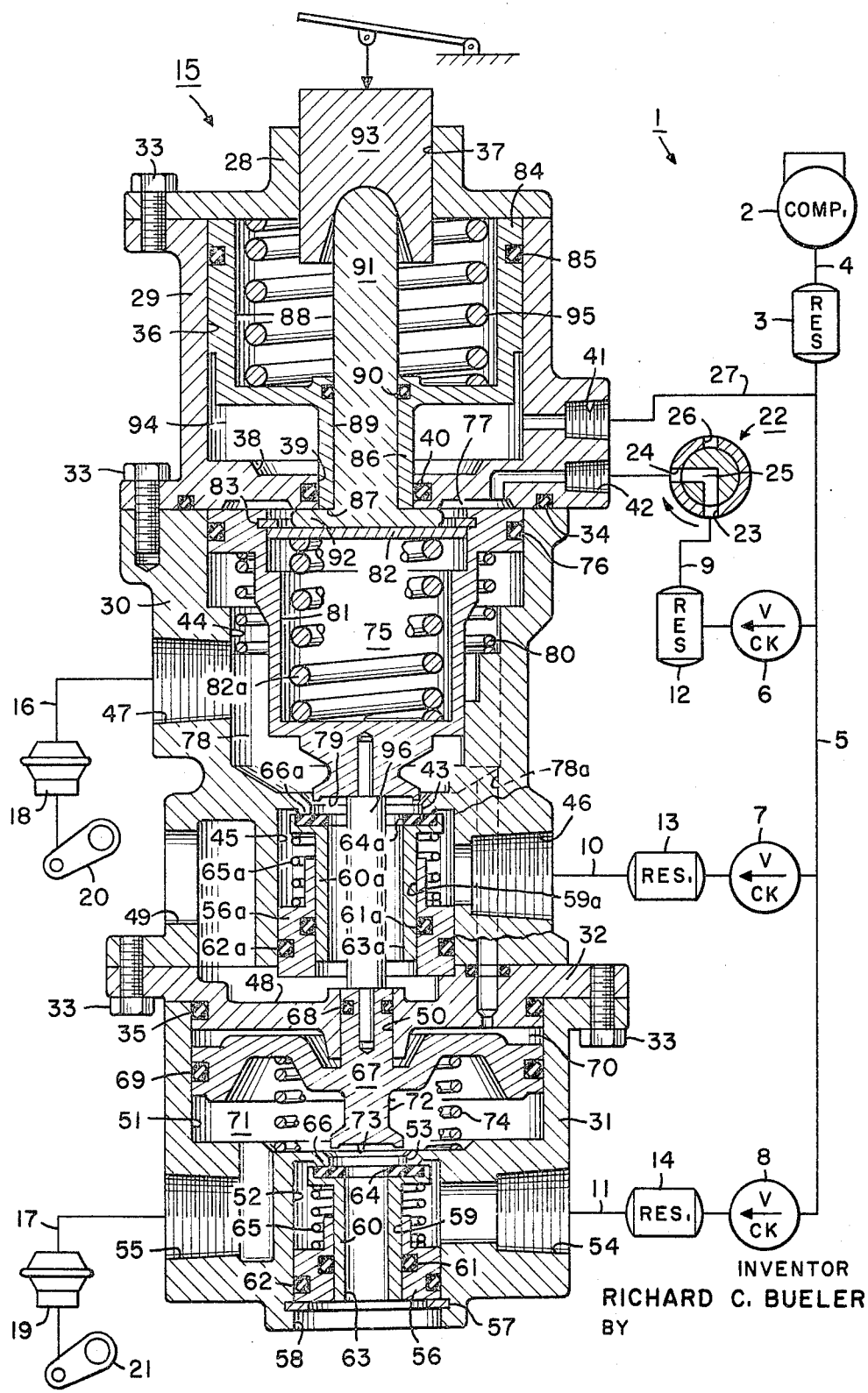

This invention relates to fluid pressure systems for vehicles and in particular to control valves therefor normally actuated in response to an applied force and having other means therein to effect actuation independently of said applied force.

In the past, various types of single or dual or tandem control valves were utilized to effect the energization of single or dual fluid pressure systems, such as those utilized on tractor vehicles or tractor-trailer vehicle combinations; however, an undesirable or disadvantageous feature of such past control valves and systems was manifested in the inability of the vehicle operator to actuate said control valves and systems in the event the operator treadle or treadle linkage to said control valves was lost, disengaged, broken, or for some other reason became inoperable to effect the actuation of said control valves and the resulting energization of said systems.

The object of the present invention is to provide a novel control valve which overcomes the aforementioned undesirable or disadvantageous feature, as well as other undersirable and disadvantageous features, and this and other objects and advantageous features of the present invention will become apparent hereinafter.

Briefly, the invention embodies a control valve including a housing having application means normally movable in response to an applied force to effect the application of fluid pressure therethrough and also movable independently of said applied force in response to control fluid pressure to also effect the application of fluid pressure therethrough. The invention also embodies fluid pressure responsive means movable in said housing when subjected to a fluid pressure less than a predetermined value to automatically drive said application means and effect pressure fluid flow through said housing independently of said applied force.

In the drawing which illustrates an embodiment of the invention,

The drawing illustrates a diagramatic view of a fluid pressure system having control value means therein in cross-section embodying the present invention.

Referring now to the drawing, a fluid pressure system 1 is shown having fluid pressure generating means, such as a compressor 2, connected with a system or main reservoir 3 by a conduit 4. Another conduit 5 is connected between the main reservoir 3 and check valves 6, 7, 8, which are in turn connected in branch conduits 9, 10, 11, respectively, to provide unidirectional pressure fluid flow from said main reservoir to auxiliary or branch reservoirs 12, 13, 14, which are interposed in said branch conduits 9, 10, 11, respectively. The branch conduits 10, 11 are respectively connected with a pair of inlet ports provided in an application or control valve 15, and conduits 16, 17 are respectively connected between brake chambers or motors 18, 19 and a pair of outlet ports also provided in said control valve, said brake chambers being operatively connected with slack adjustors 20, 21 to control the energization of friction devices or wheel brake assemblies on separate vehicle axles (not shown). A two-way or hand valve, indicated generally at 22, is provided with working ports 23, 24 serially connected in the branch conduit 9 between the branch reservoir 12 and a control port in the control valve 15, and rotatable passage means 25 is selectively movable between one position interconnecting said working ports and another position connecting the working port 24 with an atmospheric port 26 also provided in said hand valve. To complete the description of the system 1, another conduit 27 has one end intersecting with the conduit 5 in open pressure fluid communication with the main reservoir 3 while the other end thereof is connected with an emergency port provided in the control valve 15.

The control valve 15 is provided with a closure member 28, upper, intermediate and lower housing 29, 30 and 31, and a connecting plate 32 which are interconnected by suitable means, such as a plurality of studs 33, and seals 34, 35 are sealably disposed between said upper and intermediate housings 29, 30 and between said lower housing and connecting plate 31, 32, respectively.

The upper housing 29 is provided with a counterbore 36 which is closed at the upper end thereof by the closure member 28, and an axial bore or aperture 37 is provided through said closure member connecting with said counterbore. The other or lower end of the counterbore 36 is closed by radially extending wall 38 having an axial bore 39 therethrough in which is disposed a sealing member 40. Emergency and control ports 41, 42, which receive conduits 27, 9, as previously mentioned, are respectively provided in the upper housing 29, said emergency port 41 connecting with the counterbore 36 adjacent to the upper side of the radially extending wall 38 and said control port 42 intersecting with the lower side of said wall.

The intermediate housing 30 is provided with a connecting bore 43 axially interposed between a stepped upper counterbore 44 and a lower counterbore 45, and a set of inlet and outlet ports 46, 47 which receive conduits 10, 16, as previously mentioned, are provided in said intermediate housing connecting with said lower and upper counterbore, respectively. The connecting plate 32 is recessed at 48, and said recess connects between the lower counterbore 45 and an exhaust port 49 which is provided in the intermediate housing 30. The connecting plate 32 is also provided with a centrally located aperture 50 therethrough which connects with an upper counterbore 51 provided in the lower housing 31, and said upper counterbore 51 is connected with a lower counterbore 52 by a connecting bore 53 therebetween in said lower housing. Another set of inlet ports 54, 55 which receive conduits 11, 17, as previously mentioned, are provided in the lower housing 31 respectively connecting with the counterbores 52, 51.

A pair of valve guide members 56, 56a are respectively positioned in the lower and intermediate housing counterbores 52, 45, said valve guide member 56a normally being seated in displacement preventing engagement with the connecting plate 32 and said valve guide member 56 being seated in displacement preventing engagement with a snap ring and groove assembly 57 provided adjacent the lower end of the counterbore 52. The lower end of the counterbore 52 also defines an exhaust port 58. The valve guide members 56, 56a are provided with axial valve bores 59, 59a in which valve elements 60, 60a are slidably received, and seals 61, 61a and 62, 62a are carried in said valve guide members in sealing engagement with said valve elements and the lower and intermediate housing counterbores 52, 45, respectively. The valve elements 60, 60a are provided with axial exhaust openings or passages 63, 63a therethrough normally providing pressure fluid communication between the lower housing outlet and exhaust ports 55, 58 and between the intermediate housing outlet and exhaust ports 47, 49, respectively, and annular resilient seals or discs 64, 64a are provided on the upper ends of said valve elements in circumscribing relation with said exhaust openings. Valve springs 65, 65a are biased between said valve guide members 56, 56a and the valve elements 60, 60a normally urging the valve element seals 64, 64a into sealing engagement with valve seats 66, 66a provided on the lower and intermediate housings 30, 31 in circumscribing relation with the connecting bores 53, 43 thereof, and in this manner, said valve elements normally interrupt pressure fluid communication between the lower housing inlet and outlet ports 54, 55 and between the intermediate housing inlet and outlet ports 46, 47, respectively.

A stepped application member or relay piston, indicated generally at 67, is slidable in the lower housing counterbore 51 and the connecting plate bore 50 and carries peripheral seals 68, 69 in sealing engagement with said connecting plate bore and lower housing counterbore, respectively. An expansible application chamber 70 is defined in the lower housing counterbore 51 between the upper end of the relay piston 67 and the connecting plate 32, and the lower end of said relay piston defines with said lower housing counterbore an outlet chamber 71 in pressure fluid communication with the outlet port 55. An extension 72 is provided on the lower end of the relay piston 67 having a valve seat 73 on the free end thereof for operative engagement with the valve element 60, and a return spring 74 is biased between said relay piston and the lower housing 31 normally urging said relay piston toward engagement with the connecting plate 32 and spacing said relay piston valve seat 73 from said valve element 60.

Another stepped application member or reaction piston, indicated generally at 75, is slidable in the intermediate housing counterbore 44 and carries a peripheral seal 76 in sealing engagement with said intermediate housing counterbore. An expansible control chamber 77 is defined in the intermediate housing counterbore 44 between the upper end of the reaction piston 75 and the radially extending wall 38 of the upper housing 29 in pressure fluid communication with the control port 42. Another outlet chamber 78 is defined in the intermediate housing counterbore 44 adjacent the other side of said reaction piston in pressure fluid communication with the outlet port 47, and passages 78a are provided in the intermediate housing 30 and the connecting plate 32 in open pressure fluid communication between the intermediate housing outlet chamber 78 and the lower housing application chamber 70. The lower or free end of the reaction piston 75 defines a valve seat 79 for operative engagement with the valve element 60a, and a return spring 80 interposed between the intermediate housing 30 and said reaction piston normally urges said reaction piston toward abutting engagement with the radially extending wall 38 of the upper housing 29 and predeterminately spaces the reaction piston valve seat 29 from said valve element 60a. A stepped metering spring bore 81 is axially provided in the reaction piston 75, and a spring retainer or guide 82 is slidable in the bore 81 and is retained therein against displacement by a snap ring and groove assembly 83 provided adjacent to the upper end of the bore 81. The spring retainer 82 is normally urged into abutment with the snap ring 83 by the compressive force of a metering spring 82a which is pre-compressed between the retainer 82 and the lower end wall of the metering spring bore 81.

Another application member or emergency piston 84 is slidable in the upper housing counterbore 36 having a peripheral seal 85 in sealing engagement with said upper housing counterbore, and an extension 86 is integrally provided on said piston 84, said extension being slidably received in the wall bore 39 in sealing engagement with the seal 40 and having a lower or free end 87 extending into the control chamber 77 for driving engagement with the reaction piston 75. Stepped bores 88, 89 are axially provided through the emergency piston and extension 84, 86, and a seal 90 is disposed in the stepped bore 89. A push rod a force applying member 91 is slidably received in the emergency piston stepped bore 89 in sealing engagement with the seal 90, and a displacement preventing flange 92 is provided on the lower end of said push rod member normally in abutting engagement between the extension lower end 87 and the metering spring retainer 82 in the reaction piston 75. The upper end of the push rod 91 is pivotally received in a guide piston 93 which is slidable in the closure member bore 37 in response to an operator applied force thereon. Although not shown, it should be noted that a displacement preventing flange could be provided on the guide piston for displacement preventing engagement with the closure member 28 instead of on the lower end of the push rod 91 wherein the extension free end 87 could then be directly engaged with the metering spring retainer 82 along with the lower end of said push rod. An expansible fluid pressure chamber 94 is provided in the upper housing counterbore 36 between the emergency piston 84 and the upper housing wall 38 in open pressure fluid communication with the emergency port 41, and a spring 95 is biased between said emergency piston and the closure member 28 in opposition to fluid pressure expansion of said emergency chamber. To complete the description of the control valve 15, an abutment member or force transmitting linkage 96 is provided between the lower or free end of the reaction piston 75 and the upper end of the relay piston 67, said member 96 extending axially through the exhaust opening 59a of the valve element 60a and the recess 48 of the connecting plate 32.

Under normal operating conditions with the rotatable passage means 25 of the hand valve 22 rotated clockwise (in the direction of the arrow) to the venting position thereof connecting the control chamber 77 of the control valve 15 with the atmosphere, fluid pressure generated by the compressor 2 flows through the conduit 4, the main reservoir 3, the conduit 5 and branch conduit 27 and therefrom through the control valve emergency port 41 to the emergency chamber 94. The fluid pressure so established in the emergency chamber 94 acting on the effective area of the emergency piston 84 therein creates an emergency force in opposition to the compressive force of the emergency spring 95, and when the fluid pressure in said emergency chamber exceeds a predetermined value, the emergency force overcomes the compressive force of said emergency spring to move said emergency piston upwardly toward an inoperative position in abutment with the closure member 28. The generated fluid pressure also flows from the conduit 5 through the branch conduits 9, 10, 11 and the check valves 6, 7, 8 therein into the branch reservoirs 12, 13, 14, and with the hand valve 22 in the venting position thereof, pressure fluid communication between the branch reservoir 12 and the control chamber 77 of the control valve 15 is interrupted; however, pressure fluid also flows from the branch reservoirs 13, 14 through the inlet ports 46, 54 of said control valve and into the inlet chambers 45, 52 thereof. From the foregoing, it is apparent that the branch reservoirs 12, 13, 14 are protected reservoirs since the uni-directional flow valves 6, 7, 8 protect said branch reservoirs against fluid pressure loss therefrom due to a malfunctioning compressor and/or leaks in the system 1 ahead of said branch reservoirs. With the fluid pressure so established in the main and branch reservoirs 3, 12, 13, 14 and in the emergency chamber 94 of the control valve 15, the component parts of said control valve are now positioned as shown in the drawing.

If the operator desires to effect a braking application under normal operating conditions, a manually applied force on the guide piston 93 is transmitted through the push rod 91 and the retainer and metering spring 82, 82a to the reaction piston 75 and therefrom through the connecting rod 96 to the relay piston 67; therefore, said reaction and relay pistons are concertedly movable in response to the applied force downwardly against the compressive forces of the return springs 80, 74. This downward movement initially engages the reaction piston valve seat 79 with the valve element 60a closing the exhaust opening 63a therein and isolating the outlet chamber 78 from the atmosphere while also moving the relay piston valve seat 73 toward an advanced position juxtaposed with the valve element 60; however, since the travel between said relay piston valve seat 73 and said valve element 60 is predeterminately greater than that between said reaction piston valve seat 79 and said valve element 60a, said valve element 60 is not actuated by the applied force under normal operating conditions. Further downward movement of the reaction piston 75 urges the valve element 60a against the valve spring 65a to a position disengaged from the intermediate housing valve seat 66a to establish pressure fluid communication between the inlet and outlet ports 46, 47. The pressure fluid flows from the inlet port 46 through the inlet chamber 45, the connecting passage 43, the outlet chamber 78 and the outlet port 47 into the service line 16 to actuate the brake chamber 18 which, in turn, rotates the slack adjustor 20 to energize the wheel brake assembly associated therewith. At the same time, the fluid pressure so established in the outlet chamber 78 also flows therefrom through the housing passages 78a into the application chamber 70 and acts on the effective area of the relay piston 67 therein to create an application force which moves said relay piston from the advanced position thereof to engage the valve seat 73 with the valve element 60 thereby closing the valve element exhaust opening 63 and isolating the outlet chamber 71 from the atmosphere. Further downward movement of the relay piston 67 moves the valve element 60 against the valve spring 65 to a position disengaged from the lower housing valve seat 66 and establishing pressure fluid communication between the inlet and outlet ports 54, 55. In this manner, pressure fluid also flows from the inlet port 54 through the inlet chamber 52, the connecting passage 53, the outlet chamber 71 and the outlet port 55 into the service line 17 to actuate the brake chamber 19 which, in turn, rotates the slack adjustor 21 to energize the wheel brake assembly associated therewith. Of course, when the relay piston 67 is moved in response to fluid pressure in the application chamber 70, the applied force transmission of the connecting rod 96 is interrupted.

When the reaction force created by the established fluid pressure in the outlet chamber 78 acting on the effective area of the reaction piston 75 equals the manually applied force, said reaction piston is moved upwardly against the metering spring 82a wherein the valve element 60a is positioned in lapped engagement with the housing valve seat 66a and the reaction piston valve seat 79 is positioned in lapped engagement with the valve element 60a. The reaction force acting through the metering spring 82a, the retainer 82, and the push rod 91 and guide piston 93 against the manually applied force affords the operator a direct and accurate "feel" as to the extent of the braking effort or application. Similarly, when the reaction force created by the established fluid pressure in the outlet chamber 71 acting on the effective area of the relay piston 67 therein equals the application force, said relay piston is moved upwardly wherein the valve element 60 is positioned in lapped engagement with the lower housing valve seat 66 and the relay piston valve seat 73 is positioned in lapped engagement with the valve element 60. If greater braking effort is desired, the manually applied force is increased which results in an increased application force, and the component parts of the control valve 15 function in the same manner, as previously mentioned, to again move said component parts to their lapped positions.

When the desired braking effort is attained, the manually applied force is removed from the reaction piston 75 and the valve and return springs 65a, 80 move the valve element 60a and said reaction piston upwardly toward their original positions while the compressive force of the metering spring 82a also serves to return the retainer 82, the push rod 91 and guide piston 93 toward their original positions. Initially, this upward movement sealably re-engages the valve element 60a with the intermediate housing valve seat 66a to interrupt pressure fluid communication between the inlet and outlet ports 46, 47, and further upward movement of the reaction piston 75 disengages the valve seat 79 thereof from said valve element to re-establish communication between the outlet port 47 and the atmosphere and de-energize the wheel brake assemblies associated therewith by exhausting fluid pressure from the brake chamber 18 through the conduit 16, said outlet port, the outlet chamber 78, the valve element exhaust opening 63a, and the connecting plate recess 48 to the exhaust port 49. At the same time, the fluid pressure is also exhausted from the application chamber 70 through the housing passages 78a with the outlet chamber 78 and therefrom to atmosphere, as previously described. Upon the elimination of the application force, the compressive forces of the valve and return springs 65, 74 move the valve element and relay piston 60, 67 upwardly toward their original positions. Initially, this upward movement sealably re-engages the valve element 60 with the lower housing valve seat 66 to interrupt pressure fluid communication between the inlet and outlet ports 54, 55, and further upward movement of the relay piston 67 disengages the valve seat 73 thereof from said valve element to re-establish pressure fluid communication between said outlet port and the atmosphere and de-energize the wheel brake assembly associated therewith by exhausting fluid pressure from the brake chamber 19 through the conduit 17, said outlet port, the outlet chamber 71, and the valve element exhaust opening 63 to the exhaust port 58.

Under emergency conditions when the fluid pressure in the main reservoir 3 is reduced or lost due to a malfunctioning compressor and/or leaks or the like in the system 1 ahead of the protected reservoirs 6, 7, 8, the fluid pressure in the emergency chamber 94 of the control valve 15 is correspondingly reduced along with the emergency force acting on the emergency piston 84. When the fluid pressure in the emergency chamber 94 is reduced to a predetermined minimum value, the compressive force of the emergency spring 95 overcomes the opposing reduced emergency force and moves said emergency piston downwardly in the upper housing bores 36, 39. Since the lower end 87 of the emergency piston extension 86 in the control chamber 77 is normally engaged with the reaction piston 75 in the inoperative position thereof, the downward movement of the emergency piston 84 mechanically drives the reaction piston 75 to actuate the valve element 60a and automatically establish pressure fluid communication between the inlet and outlet ports 46, 47, and the relay piston 67 is also movable in response to established fluid pressure at the outlet port 47 transmitted through the housing passages 78a into the application chamber 70 to actuate the valve element 60 and automatically establish pressure fluid communication between the inlet and outlet ports 54, 55, as previously described in detail hereinabove. Since the protected reservoirs 13, 14 are protected against depletion or reduction of the fluid pressure therein by the uni-directional check valves 7, 8 when the fluid pressure in the main reservoir 3 is so reduced or depleted, it is obvious that such energization of the wheel brake assemblies under these emergency conditions is effected under full reservoir pressure from the protected reservoirs 13, 14.

In the event that the operator treadle or treadle linkage is lost, broken or disengaged from the control valve 15, or for some other reason becomes inoperative for transmitting the operator applied force, the operator can manually actuate the system 1 to offset or simulate emergency conditions by manually moving the rotatable passage means 25 of the hand valve 22 in a counterclockwise direction (opposite to the directional arrow) to a position interconnecting the hand valve ports 23, 24 and establishing pressure fluid communication through the branch conduit 9 between the branch reservoir 12 and the control chamber 77 of the control valve 15 through the control port 42 thereof. When the system 1 is manually actuated in this manner to simulate emergency conditions, the control fluid pressure in the control chamber 77 acts on the effective area of the reaction piston 75 therein to effect downward movement thereof. This downward movement of the reaction piston actuates the valve element 60a and establishes pressure fluid communication between the inlet and outlet ports 46, 47, and the relay piston 67 is also movable in response to established fluid pressure at the outlet port 47 transmitted through housing passages 78a into the application chamber 70 to actuate the valve element 60 and establish pressure fluid communication between the inlet and outlet ports 54, 55, as previously described in detail hereinbefore. Of course, when the control fluid pressure in the control chamber 77 is again vented to the atmosphere by manually moving the rotatable passage means 25 of the hand valve 22 to the venting position thereof, the reaction and relay pistons 75, 67 and the valve elements 60, 60a are returned to their original inoperative positions, as previously described.

In the event of fluid pressure failure due to leaks or the like in one of the branch systems connected with the branch reservoirs 12, 13, 14, it is obvious that the fluid pressure in the main reservoir 3 will be thereby reduced in an attempt to replenish the depleted fluid pressure in the leaking one of the branch reservoirs 12, 13, 14; therefore, when the fluid pressure in the main reservoir 3 is so reduced to the aforementioned predetermined minimum value, the emergency piston 84 is moved by the emergency spring 95 to effect the automatic actuation of the relay and reaction pistons 67, 75 and their associated valve elements 60, 60a and establish pressure fluid communication between the inlet and outlet ports 46, 47 and 54, 55, respectively. In this manner, at least one of the wheel brake assemblies is energized in the emergency condition. Further, in the event of pressure fluid failure at the outlet port 47, the connecting rod 96 serves to mechanically actuate the relay piston 67 and valve element 60 to insure the establishment of pressure fluid communication between the inlet and outlet ports 54, 55.

From the foregoing, it is obvious that a novel control valve 15 meeting the objects and advantages set out hereinbefore, and others, is provided and that changes or modifications to the precise configurations, shapes or details of the construction of said control valve set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a pressure fluid flow passage therethrough, application means movable in said housing and controlling said flow passage, said application means defining with said housing an expansible fluid pressure chamber for selective subjection to the atmosphere and fluid pressure, force applying means for said application means, said application means movable in response to the operation of said force applying means toward an actuated position in said flow passage establishing pressure fluid flow therethrough when said chamber is connected to the atmosphere and said application means being movable independently of the operation of said force applying means toward its actuated position in response to fluid pressure in said chamber upon the subjection thereof to fluid pressure, and resiliently urged means movable in said housing for driving engagement with said application means and defining with said housing another expansible fluid pressure chamber, said resiliently urged means being movable in response to fluid pressure in said other chamber less than a predetermined value to drive said application means toward its actuated position.

2. The control valve according to claim 1 wherein said housing includes another pressure fluid flow passage therethrough, other application means movable in said housing and controlling said other flow passage, and abutment means between said first named and other application means and providing movement of said other application means toward an actuated position in said other flow passage establishing pressure fluid flow therethrough upon the resiliently urged means movement of said first named application means.

3. The control valve according to claim 1 wherein said resiliently urged means includes piston means movable in said housing and defining therewith said other chamber, extension means on said piston means extending into said first named chamber for driving engagement with said application means, and spring means urging said piston means in opposition to fluid pressure expansion of said other chamber.

4. The control valve according to claim 3, wherein said force applying means includes push rod means extending through said piston means and extension means, a driving end on said push rod means and in said first named chamber for driving engagement with said application means, and a force receiving end on said push rod means opposite said driving end, said push rod means being movable in response to an applied force on the force receiving end thereof to drive said application means toward its actuated position.

5. The control valve according to claim 4, comprising means adjacent to said driving end extending into abutting engagement between said extension means and said application means.

6. The control valve according to claim 1, comprising means on said force applying means extending into displacement preventing engagement with said housing.

7. The control valve according to claim 1 wherein the force of said resiliently urged means and the force of the other fluid pressure in said first named chamber acting on said application means are additive.

8. The control valve according to claim 1 wherein said force applying means includes a driving portion extending through said resiliently urged means for driving engagement with said application means and a force receiving portion for receiving an applied force from exteriorly of said housing, said force applying means being movable in response to the applied force on said force receiving portion to normally move said application means toward the actuated position thereof.

9. The control valve according to claim 8, comprising means on said force applying means adjacent to said driving end extending into abutting engagement between said resiliently urged means and said application means.

10. The control valve according to claim 1 comprising other means in said housing providing another pressure fluid flow passage therethrough, other application means movable in said housing to control said other flow passage and defining with said housing an expansible application chamber in opposition to said other flow passage and connected in pressure fluid communication with said first named flow passage, said other application means being normally movable in response to established fluid pressure in said first named flow passage and application chamber toward an actuated position in said other flow passage establishing pressure fluid flow therethrough.

11. The control valve according to claim 10 comprising abutment means between said first named and other application means, said abutment means being movable in response to movement of said first named application means toward its actuated position to move said other application means toward its actuated position in the event of fluid pressure failure in said first named flow passage.

12. A control valve comprising a housing having inlet and outlet ports therein, valve means controlling pressure fluid communication between said inlet and outlet ports, a valve control member movable in said housing for operative engagement with said valve means, said valve control member defining with said housing an expansible fluid pressure chamber, a control port connected with said chamber for selective subjection to the atmosphere and fluid pressure, force applying means for said valve control member, said valve control means being normally movable in response to the operation of said force applying means when said control port is subjected to the atmosphere to engage and move said valve means toward an actuated position establishing pressure fluid communication between said inlet and outlet ports and said valve control member being movable independently of the operation of said force applying means in response to fluid pressure in said chamber to actuate said valve means when said control port is subjected to fluid pressure and resiliently urged means movable in said housing for driving engagement with said valve control member and defining with said housing another expansible fluid pressure chamber, said resiliently urged means being movable in response to fluid pressure in said other chamber less than a predetermined value to drive said valve control member and actuate said valve means.

13. The control valve according to claim 12 comprising other inlet and outlet ports in said housing, other valve means controlling pressure fluid communication between said other inlet and outlet ports, another valve control member movable in said housing for operative engagement with said other valve means, abutment means between said first named and other valve control members and providing movement of said other valve control member to engage and move said other valve means to an actuated position establishing pressure fluid communication between said other inlet and outlet ports upon the resiliently urged means movement of said first named valve control member.

14. The control valve according to claim 12 including a valve seat on said housing between said inlet and outlet ports, said valve means being normally urged into engagement with said valve seat to interrupt pressure fluid communication between said inlet and outlet ports and said valve means being movable toward the actuated position thereof and disengaged from said valve seat in response to movement of said valve control member.

15. The control valve according to claim 12 wherein said resiliently urged means includes piston means movable in said housing and defining therewith said other chamber, extension means on said piston means extending into said first named chamber for driving engagement with said valve control member, and spring means urging said piston means to oppose fluid pressure expansion of said other chamber.

16. The control valve according to claim 12 wherein said resiliently urged means includes stepped piston members slidable in said housing, the larger of said stepped piston members defining with said housing said other chamber and the smaller of said stepped piston portion extending into said first named chamber having a free end in driving engagement with the other end portion of said valve control member, and spring means engaged between said larger stepped piston member and said housing opposing fluid pressure expansion of said other chamber, said stepped piston member being movable against said spring means toward an inoperative position in engagement with said housing when the fluid pressure in said chamber exceeds the predetermined value, and said spring means urging said stepped piston member toward an operative position when the fluid pressure in said other chamber is less than the predetermined value to automatically drive said valve control member in the direction to actuate said valve means independently of the operation of said force applying means.

17. The control valve according to claim 12 wherein said resiliently urged means includes a piston member slidable in said housing and defining therewith said other chamber, spring means biased between said piston member and housing and opposing expansion of said other chamber, said piston member being movable against said spring means toward an inoperative position in said housing when the fluid pressure in said other chamber exceeds the predetermined value, extension means on said piston member slidable in said housing and extending into said first named chamber, and a free end on said extension means in said first named chamber for driving engagement with said valve control member, said spring means urging said piston member from the inoperative position thereof when the fluid pressure in said other chamber is reduced below the predetermined value to automatically drive said first named valve control member in the direction to actuate said valve means.

18. The control valve according to claim 12, wherein said force applying means extends through said resiliently urged mean having a driving portion thereon for driving engagement with said valve control member, and a force receiving portion opposite said driving portion for receiving an applied force.

19. The control valve according to claim 12 including means on said force applying means between said driving and force receiving portions for displacement preventing engagement with said housing.

20. The control valve according to claim 15, wherein said force applying means includes rod means movable in said piston means and extension means, a driving end on said rod means for driving engagement with said valve control member, and a force receiving end on said rod means opposite said driving end for receiving a force from exteriorly of said housing.

References Cited by the Examiner
UNITED STATES PATENTS

| | | | |
|---|---|---|---|
| 2,289,559 | 7/1942 | Turek | 303—63 |
| 3,059,975 | 10/1962 | Morse | 303—40 |
| 3,151,914 | 10/1964 | Stelzer | 303—15 |
| 3,152,844 | 10/1964 | Bueler | 303—52 |
| 3,227,494 | 1/1966 | Alfieri | 303—13 |

EUGENE G. BOTZ, *Primary Examiner.*